United States Patent [19]

d'Alayer de Costemore d'Arc

[11] Patent Number: 4,594,629
[45] Date of Patent: * Jun. 10, 1986

[54] CASSETTE CLEANING DEVICE

[75] Inventor: Stephane M. d'Alayer de Costemore d'Arc, Ways, Belgium

[73] Assignee: Allsop, Inc., Bellingham, Wash.

[*] Notice: The portion of the term of this patent subsequent to Apr. 10, 2001 has been disclaimed.

[21] Appl. No.: 597,403

[22] Filed: Apr. 5, 1984

Related U.S. Application Data

[63] Continuation of Ser. No. 312,370, Oct. 16, 1981, Pat. No. 4,442,468.

[30] Foreign Application Priority Data

Oct. 24, 1980 [BE] Belgium ............................. 885,871

[51] Int. Cl.⁴ ............................................. G11B 5/41
[52] U.S. Cl. ..................... 360/128; 360/137; 15/DIG. 12
[58] Field of Search ................ 360/128, 137; 15/DIG. 12

[56] References Cited

U.S. PATENT DOCUMENTS

| | | | |
|---|---|---|---|
| 3,647,990 | 3/1972 | Eul | 360/128 |
| 4,141,053 | 2/1979 | Kara | 360/128 |
| 4,149,206 | 4/1979 | Loiselle | 360/128 |
| 4,225,893 | 9/1980 | Loiselle | 360/128 |
| 4,272,796 | 6/1981 | Kreuningen | 360/128 |

Primary Examiner—A. J. Heinz
Attorney, Agent, or Firm—Hughes & Cassidy

[57] ABSTRACT

A cleaning cassette for cassette recorders in which movement of either spindle of the cassette recorder operates a cleaning element within the cassette casing. Transmission of the rotary movement is achieved by a pair of rotatably mounted reel hubs and a pair of exterior toothed wheels, one integral with each hub, with the reel hubs coupled together by a third intermediate exterior toothed wheel to form a permanent gear train. For driving a cleaning element, such as a felt tab, the intermediate wheel drives a cam and lever. By rotating either toothed wheel, the intermediate wheel causes the lever to move the tab alternately back and forth substantially parallel to the front edge of the cassette casing.

61 Claims, 2 Drawing Figures

CASSETTE CLEANING DEVICE

CROSS REFERENCE TO RELATED APPLICATIONS

This is a continuation of application U.S. Ser. No. 312,370, filed Oct. 16, 1981, and now issued as U.S. Pat. No. 4,442,468 on Apr. 10, 1984.

TECHNICAL FIELD

The present invention relates to cassettes containing devices for cleaning the driving and recording elements of cassette recorders.

While reference is made herein to "tape recorders" or "cassette recorders", such units are conventionally so equipped as to play back as well as to record on tape in cassettes and the terms are to be so understood.

BACKGROUND ART

Heretofore, numerous devices have been proposed for cleaning the driving and recording elements of cassette recorders, e.g., the capstans, rollers and heads. One of the best known of these cleaning devices is a cassette loaded with a short length of slightly abrasive cleaning tape but since this tape has a thickness much greater than that of a normal recording tape, it involves the risks of damaging or putting out of adjustment some of the tape recorder members for guiding, driving and recording/playing back the tape.

Another known cassette for cleaning contains a device actuated by one of the take-up or supply spindles (German Utility Model No. 6,928,925 of July 22, 1969 in the name of Becker Autoradiowerk GmbH), but since cassettes of this type have only one working side (take-up reel) their great disadvantages are:

(1) that they cannot be used on "bi-directional" units; bi-directional drive tape recorders are frequently equipped on each of the reels with an automatic stop device, such as described in Schatteman, U.S. Pat. No. 3,488,017 and since, in a cleaning cassette of this type the supply reel is not driven, the automatic stop device of the tape recorder immediately operates either to stop the unit or eject the cassette;

(2) that they require close attention by users when introduced into single direction drive tape recorders, since such a cleaning cassette must always be inserted in such a way that the reel hub within the cassette which actuates the cleaning elements is placed on the take-up reel spindle; if this rule is not observed, no cleaning takes place and the cleaning cassette is immediately ejected if the tape player is equipped with a mechanical stop or the tape player is switched off if it is equipped with an automatic stop device of the type described in U.S. Pat. No. 3,488,017; since most users are unaware of this kind of technical problem, they will conclude from this that their cleaning cassette is completely out of order.

DISCLOSURE OF INVENTION

The main object of the present invention is, therefore, to overcome these disadvantages and to provide a cleaning device which is simple, inexpensive and effective, whatever the type of cassette recorder on which it is used and type of automatic stop with which the cassette recorder is equipped.

Another object of the present invention is to provide a cleaning device which is completely safe to use in cassette recorders to clean the tape driving components and heads.

A more specific object of the present invention is to provide a cleaning device in the form of a cleaning cassette which is effective to clean the components of either single directional or bi-directional cassette recorders and which can be inserted with either side considered the working side so as to be usable for cleaning purposes in a wide range of different types of units.

BRIEF DESCRIPTION OF DRAWINGS

Further objects of the invention will appear from the following description of two preferred embodiments, taken in conjunction with the accompanying drawings in which.

BEST MODE FOR CARRYING OUT THE INVENTION

Figure 1:
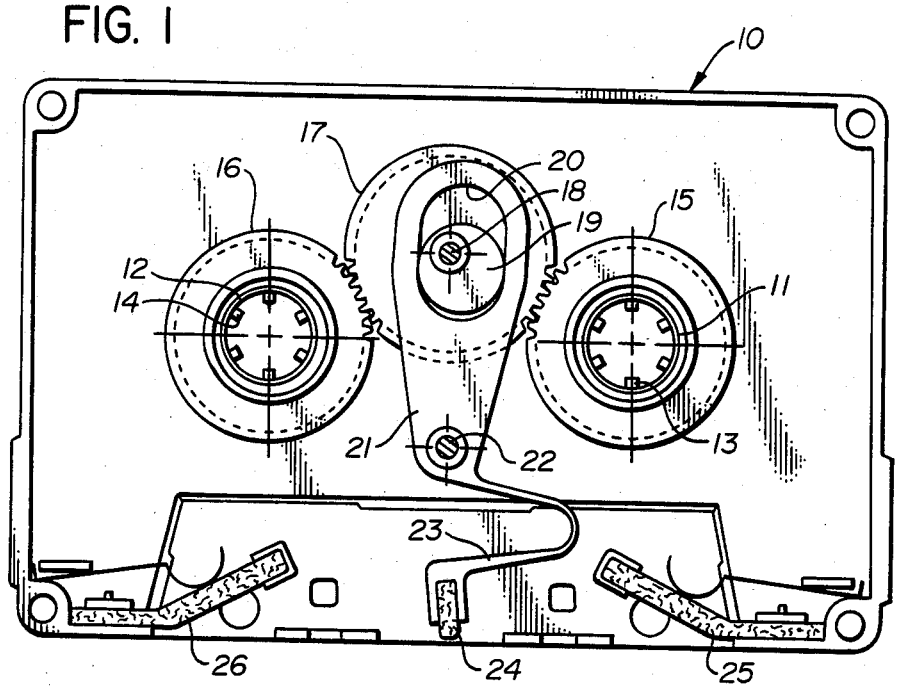
FIG. 1 is a plan view of a cleaning cassette embodying the invention with one side of the cassette casing removed to show the components within the casing cavity.

Referring to FIG. 1, th elements of a cleaning cassette constructed in accordance with the invention are mounted in the interior of the casing 10 of a cassette and include means for transmitting the rotary movement of either spindle of the tape recorder to operate a cleaning element within the casing 10. The transmission of the rotary movement may be effected by different mechanical devices but, in keeping with this preferred embodiment, that transmission is achieved by means including a pair of rotatably mounted reel hubs 11, 12 and a pair of exterior toothed wheels 15, 16, one integral with each hub and adapted to interact with the spindles of the tape recorder having, for that purpose, interior driving teeth 13, 14. So that the cleaning element is operated irrespective of which spindle is operative, keeping with the invention, the reel hubs 11, 12 are coupled together so that the cleaning device is operated when either one is rotated. For this purpose the exterior teeth of the wheels 15, 16 mesh with a third intermediate exterior toothed wheel 17 which rotates about a fixed spindle 18, so as to form a permanent gear train. The three toothed wheels 15, 16, 17 preferably have the same dimensions so that the whole assembly can be manufactured at low cost.

For driving a cleaning element 24, for example a tab made of felt, the intermediate wheel 17 carries, at its center and around the spindle 18, a cam 19 which interacts with a cut-out 20 provided in lever 21 which is carried to oscillate about a pivot 22. The oscillating lever 21 extends toward the front edge of the cassette casing from the pivot 22, having a flexible arm 23 carrying at its end the cleaning element 24. By rotating either toothed wheel 15, 16, the intermediate wheel 17 causes the lever 21 to swing the tab 24 alternately back and forth substantially parallel to the front edge of the cassette casing. With this movable tab 24 located substantially in the center of the casing of the cassette 10 and along one of its longitudinal edges, the feld tab 24 cleans the head of a cassette recorder unit into which the cleaning cassette is introduced.

The cleaning cassette 10 also desirably contains other felt tabs 25, 26, intended for cleaning the rollers and capstans of the unit which is similar to the provision in conventional cleaning cassettes.

Figure 2:
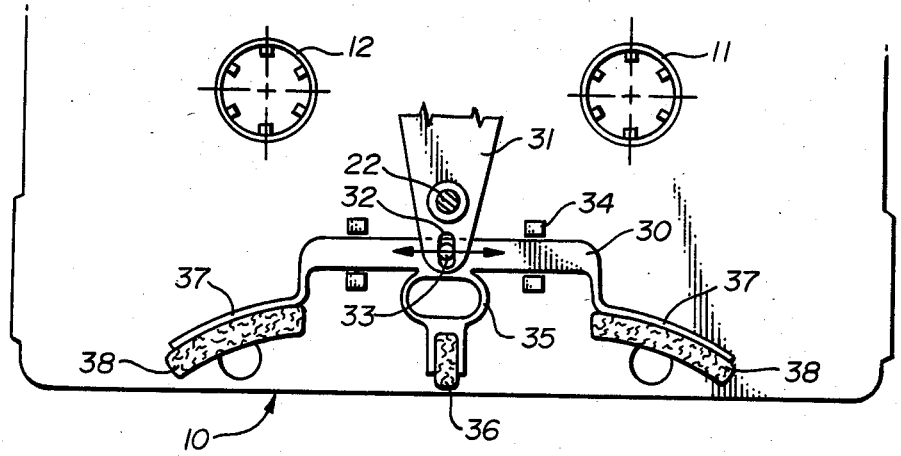
FIG. 2 is a fragmentary plan view of another cleaning cassette embodying the invention showing, as in FIG. 1, the components within the casing cavity.

Referring now to FIG. 2, illustrating an alternative embodiment of the invention, there is provided, in keeping with the invention, instead of a movable cleaning element for the head and fixed cleaning element for the capstans and pressure rollers, movable cleaning elements for all such tape drive and head members. For this purpose, a strip 30 is mounted to reciprocate alternately back and forth and provided with cleaning elements to carry out the simultaneous cleaning of the head, the rollers and the capstans of a tape recorder into which the device is inserted. Further, in keeping with the invention, the movement of the strip 30 and cleaning elements actuated thereby does not interfere with members insuring the actual guidance of the tape in the unit.

For producing the back and forth movement of the strip 30, a lever 31 is provided which is driven in the same way as the lever 21 of FIG. 1 and pivots about a spindle 22. To translate rocking movement of the lever 31 to movement of the separately mounted strip 30, the lever 31 is provided in its end with an elongated hole 32 which interacts with a stud 33 carried by the strip 30. To guide the strip 30 in its back and forth movement, projections 34 molded in the case 10 of the cassette are provided on each side of the strip.

For cleaning purposes, at its center the strip 30 carries, via flexible support arms 35, a cleaning tab 36 for the head, while towards its ends this strip 30 has support fingers 37 carrying a tab 38 for cleaning the rollers and capstans. Other types of soft, cleaning tabs may be used. The fingers 37 are capable of flexing during the back and forth movement of the strip 30 to enhance the cleaning action by obtaining better penetration around the capstans to engage the rollers without damaging the members by exerting excess force against them.

It will, therefore, be noted that a cleaning device according to this invention has the advantage that it can be used on all cassette recorders, either one-way or bi-directional, and can be introduced into these units with either side of the cassette considered the working side.

What is claimed is:

1. A cleaning device for cleaning a head of a tape cassette player, where said player has a cassette receiving area to receive a tape cassette in a playing position, and a pair of spaced spindles to engage first and second spools of said tape cassette, which spindles are at predetermined spindle locations in said cassette receiving area, said device comprising:
    a. a cassette housing adapted to be inserted in said cassette receiving area in an operating location;
    b. a drive system comprising:
        1. a first drive member rotatably mounted in said cassette housing at a first drive location where, with said housing in its operating position, said first drive member engages said first spindle in drive relationship so as to be rotatable with said first spindle;
        2. a second drive member rotatably mounted in said cassette housing at a second drive location where, with the housing in its operating position, said second drive member engages said second spindle in drive relationship so as to be rotatable with said second spindle;
        3. an interconnecting drive means operatively engaging said first and second drive members in a manner that rotational movement of one of said first and second drive members causes the other of said first and second drive members to rotate;
    c. a cleaning member having a cleaning portion positioned to engage the head of the player, said cleaning member being mounted in said housing to be driven on a cleaning path by which said cleaning portion wipes against the head of the player;
    d. said first and second drive members being first and second wheel members, respectively, and said interconnecting drive means is a third wheel member operatively engaging said first and second wheel members;
    whereby when either spindle of the player is rotated under power from the player, the drive member engaging that spindle is caused to rotate to insure that the other of the spindles is rotating, and the cleaning member is caused to move in a path to clean the head of the player.

2. The device as recited in claim 1, wherein said first, second and third wheel members are interconnecting first, second and third gear members.

3. The device as recited in claim 2, wherein there is a cam member operatively connected to said third gear member, and said cleaning member has a cam follower operatively engaging said cam member to cause back and forth movement of said cleaning portion.

4. The device as recited in claim 3, wherein said cam member is mounted eccentrically on said third gear member at a location intermediate said first and second gear members.

5. The device as recited in claim 4, wherein said cleaning member has a lengthwise axis generally aligned with a longitudinal front-to-rear axis of the housing, and said cleaning member is pivotally mounted at a pivot location located on the lengthwise axis of the cleaning member, the cam follower of the cleaning member and the cam member being also aligned with said lengthwise axis of the cleaning member, whereby the back and forth motion of the cleaning portion is transverse to said longitudinal axis.

6. The device as recited in claim 5, wherein said cam member comprises a generally circular cam mounted eccentrically to said interconnecting drive gear, and said cam follower comprises two side portions mounted on opposite sides of said cam.

7. The device as recited in claim 1, wherein said cleaning member is moved on said cleaning path by rotation of said third wheel member.

8. A cleaning device for cleaning a head of a tape cassette playing and/or recording machine, where the machine has a cassette receiving area to receive a tape cassette in a playing position, and first and second spaced spindles, said device comprising:
    a. a cassette housing adapted to be inserted in said cassette receiving area in an operating position;
    b. a drive system mounted in said housing and comprising first and second drive members mounted in said housing and having an operative connection to said first and second spindles, respectively, said drive members being interconnected by interconnecting means in a manner that rotation of said first spindle acts through said first drive member to in turn act through said second drive member to cause rotation of the second spindle;
    c. a cleaning member having a cleaning portion positioned to engage the head of the machine, said cleaning member being mounted in said housing for back and forth wiping motion to clean said head, said cleaning member being operatively connected to said drive system in a manner that rotation of at least one of said spindles drives said cleaning member along said back and forth motion.

9. The device as recited in claim 8, wherein said cleaning member comprises a mounting portion which is arranged for back and forth motion on a substantially rectilinear path.

10. The device as recited in claim 9, wherein the mounting portion of the cleaning member is driven on said back and forth rectilinear path by movement of a lever member.

11. The device as recited in claim 10, further comprising guide means to restrain movement of said mounting portion to said substantially rectilinear path.

12. The device as recited in claim 9, wherein there is a second cleaning portion positioned to clean at least one of a capstan and pinch roller of said machine.

13. The device as recited in claim 12, wherein said second cleaning portion is mounted to said cleaning member and is arranged in a manner that said cleaning member in moving on said cleaning path imparts a cleaning motion of said second cleaning portion relative to said capstan and pinch roller.

14. The device as recited in claim 8, wherein there is a second cleaning portion positioned to clean at least one of a capstan and pinch roller of said machine.

15. The device as recited in claim 14, wherein said second cleaning portion is mounted to said cleaning member and is arranged in a manner that said cleaning member in moving on said cleaning path imparts a cleaning motion of said second cleaning portion relative to said capstan and pinch roller.

16. The device as recited in claim 8, wherein said cleaning member comprises a mounting portion which is mounted in said cassette housing for said back and forth motion on an arcuate path.

17. A cleaning device for cleaning a head of a tape cassette playing and/or recording machine, where the machine has a cassette receiving area to receive a tape cassette in a playing position, first and second spaced spindles, and a capstan and pinch roller which cooperate with one another to move a playing and/or recording tape through said machine on a tape path passing adjacent said head and between said capstan and said pinch roller, said device comprising:
a cassette housing adapted to be inserted in said cassette receiving area in an operating location;
b. a drive system mounted in said cassette housing to drivingly interconnect said spindles, said drive system comprising:
  1. a first hub member rotatably positioned in said cassette housing to engage said first spindle so as to be rotatable therewith;
  2. a second hub member rotatably positioned in said cassette housing to engage said second spindle so as to be rotatable therewith; and
  3. an interconnecting drive means positioned in said cassette housing and operatively engaging said two hub members in a manner that rotation of one of said hub members causes rotation of the other of said hub members; and
c. said device further comprising in addition to said drive system a cleaning member having cleaning portion for cleaning said head, said cleaning member being positioned in said device to be driven on a cleaning path other than said tape path, means to move said cleaning member on said cleaning path in response to rotation of at least one of said spindles to impart a cleaning motion to said cleaning portion.

18. The device as recited in claim 17, wherein said cleaning member comprises a mounting portion which is mounted in said cassette housing for movement on an arcuate path.

19. The device as recited in claim 18, wherein said mounting portion is driven on said arcuate path in a back and forth motion.

20. The device as recited in claim 19, wherein said first and second hub members are connected to first and second wheel members, respectively, and there is a third wheel member operatively engaging said first and second wheel members.

21. The device as recited in claim 18, wherein said first and second hub members are connected to said first and second wheel members, respectively, and there is a third wheel member operatively engaging said first and second wheel members.

22. The device as recited in claim 21, wherein said cleaning member is moved on said cleaning path by rotation of said third wheel member.

23. The device as recited in claim 17, wherein said cleaning member comprises a mounting portion which is arranged for back and forth motion on a substantially rectilinear path.

24. The device as recited in claim 23, wherein the mounting portion of the cleaning member is driven on said back and forth rectilinear path by movement of a lever member.

25. The device as recited in claim 24, wherein said lever member is pivotally mounted to said cassette housing.

26. The device as recited in claim 17, wherein said first and second hub members are connected to first and second gear members, respectively, which are drivingly interconnected.

27. The device as recited in claim 26, wherein there is a third gear member which operatively interconnects said first and second gear members.

28. The device as recited in claim 27, wherein said cleaning member is moved on said cleaning path by rotation of said third gear member.

29. The device as recited in claim 28, wherein said cleaning member has a mounting portion which is driven on an arcuate path in a back and forth motion.

30. The device as recited in claim 26, wherein said cleaning member comprises a mounting portion which is arranged for back and forth motion on a substantially rectilinear path.

31. The device as recited in claim 30, further comprising guide means to restrain movement of said mounting portion to said substantially rectilinear path.

32. The device as recited in claim 31, wherein said guide means comprises a plurality of guide members engaging said mounting portion.

33. The device as recited in claim 30, wherein there is a second cleaning portion positioned to clean at least one of a capstan and pinch roller of said machine.

34. The device as recited in claim 33, wherein said second cleaning portion is mounted to said cleaning member and is arranged in a manner that said cleaning member is moving on said cleaning path imparts a cleaning motion of said second cleaning portion relative to said capstan and pinch roller.

35. The device as recited in claim 26, wherein there is a second cleaning portion positioned to clean at least one of a capstan and pinch roller of said machine.

36. The device as recited in claim 35, wherein said second cleaning portion is mounted to said cleaning member and is arranged in a manner that said cleaning member in moving on said cleaning path imparts a cleaning motion of said second cleaning portion relative to said capstan and pinch roller.

37. The device as recited in claim 17, wherein there is a second cleaning portion positioned to clean at least one of a capstan and pinch roller of said machine.

38. The device as recited in claim 37, wherein said second cleaning portion is mounted to said cleaning member and is arranged in a manner that said cleaning member in moving on said cleaning path imparts a cleaning motion of said second cleaning portion relative to said capstan and pinch roller.

39. A cleaning device for cleaning a head of a tape cassette playing and/or recording machine, where the machine has a cassette receiving area to receive a tape cassette in a playing position, and first and second spaced spindles, said device comprising:
a. cassette housing adapted to be inserted in said cassette receiving area in an operating position;
b. a cleaning member having a cleaning portion adapted to engage the head of the machine and being mounted in said cassette housing for movement on a back and forth cleaning path where said cleaning portion moves back and forth relative to said head;
c. a drive system mounted in said housing and having an operative connection to said cleaning member to cause said cleaning member to move on said back and forth cleaning path in response to rotation of at least one of said spindles, and also having interconnecting means providing an operative connection between said spindles in a manner that rotation of a first spindle acts through said drive system to cause rotation of the second spindle.

40. The device as recited in claim 39, wherein said cleaning member comprises a mounting portion which is arranged for back and forth motion on a substantially rectilinear path.

41. The device as recited in claim 39, wherein said cleaning member comprises a mounting portion which is mounted in said cassette housing for said back and forth motion on an arcuate path.

42. The device as recited in claim 39, wherein there is a second cleaning portion positioned to clean at least one of a capstan and pinch roller of said machine.

43. The device as recited in claim 42, wherein said second cleaning portion is mounted to said cleaning member and is arranged in a manner that said cleaning member in moving on said cleaning path imparts a cleaning motion of said second cleaning portion relative to said capstan and pinch roller.

44. A cleaning device for cleaning a head of a tape cassette playing and/or recording machine, where the machine has a cassette receiving area to receive a tape cassette in a playing position, and first and second spaced spindles, said device comprising:
a. a cassette housing adapted to be inserted in said cassette receiving area in an operating position;
b. a cleaning member having a cleaning portion, said cleaning member being positioned in said housing to be driven on a cleaning path in response to rotation of at least one of said spindles to impart a cleaning motion to said cleaning portion, relative to said head;
c. a drive system mounted in said housing and comprising first and second drive members mounted in said housing and having an operative connection to said first and second spindles, respectively, when said cassette housing is in said operating location, said drive members being interconnected by interconnecting means in a manner that rotation of said first spindle acts through said first drive member and through said second drive member to cause rotation of the second spindle, said drive system further comprising a rotatably mounted wheel member located centrally in said housing relative to locations of said first and second spindles when said housing is in said operative position; said wheel member being in positive drive engagement with said cleaning member in a manner that rotation of said wheel member positively drives said cleaning member on said cleaning path, said drive members being in positive drive engagement with said wheel member in a manner that at least one of said drive members positively drives said wheel member to cause rotation thereof, with the wheel member in turn causing said cleaning member to travel on said cleaning path.

45. The device as recited in claim 44, wherein said cleaning member comprises a mounting portion which is mounted in said cassette housing for movement on an arcuate path.

46. The device as recited in claim 45, wherein said mounting portion is driven on said arcuate path in a back and forth motion.

47. The device as recited in claim 44, wherein said cleaning member comprises a mounting portion which is arranged for back and forth motion on a substantially rectilinear path.

48. The device as recited in claim 44, wherein said cleaning member comprising the mounting portion of the cleaning member is driven on said back and forth rectilinear path by movement of a lever member.

49. The device as recited in claim 44, wherein there is a second cleaning portion positioned to clean at least one of a capstan and pinch roller of said machine.

50. The device as recited in claim 49, wherein said second cleaning portion is mounted to said cleaning member and is arranged in a manner that said cleaning member in moving on said cleaning path imparts a cleaning motion of said second cleaning portion relative to said capstan and pinch roller.

51. A cleaning device for cleaning a head of a tape cassette playing and/or recording machine, where the machine has a cassette receiving area to receive a tape cassette in a playing position, and first and second spaced spindles, said device comprising:
a. a cassette housing adapted to be inserted in said cassette receiving area in an operating position;
b. a drive system mounted in said housing, said drive system comprising first and second hub members which, with said cassette housing in said operating location, engage said first and second spindles, respective, in drive relationship so as to be rotatable therewith, and a gear drive transmission comprising interconnecting gear means positioned in the cassette housing for interconnecting the first and second hub members in a manner that rotation of one of said hub members causes rotation of the other of said hub members;
c. a cleaning member having a cleaning portion, said cleaning member being positioned in said housing to be driven on a cleaning path in response to rotation of at least one of said spindles to impart a cleaning motion to said cleaning portion, relative to said head.

52. The device as recited in claim 51, wherein said cleaning member comprises a mounting portion which is mounted in said cassette housing for movement on an arcuate path.

53. The device is recited in claim 52, wherein said mounting portion is driven on said arcuate path in a back and forth motion.

54. The device as recited in claim 51, wherein said cleaning member comprises a mounting portion which is arranged for back and forth motion on a substantially rectilinear path.

55. The device as recited in claim 54, wherein the mounting portion of the cleaning member is driven on said back and forth rectilinear path by movement of a lever member.

56. The device as recited in claim 51, wherein said first and second hub members are connected to first and second gear members, respectively, which are drivingly interconnected.

57. The device as recited in claim 56, wherein said cleaning member comprises a mounting portion which is arranged for back and forth motion on a substantially rectilinear path.

58. The device as recited in claim 57, wherein there is a second cleaning portion positioned to clean at least one of a capstan and pinch roller of said machine.

59. The device as recited in claim 58, wherein said second cleaning portion is mounted to said cleaning member and is arranged in a manner that said cleaning member in moving on said cleaning path imparts a cleaning motion of said second cleaning portion relative to said capstan and pinch roller.

60. The device as recited in claim 51, wherein there is a second cleaning portion positioned to clean at least one of a capstan and pinch roller of said machine.

61. The device as recited in claim 60, wherein said second cleaning portion is mounted to said cleaning member and is arranged in a manner that said cleaning member in moving on said cleaning path imparts a cleaning motion of said second cleaning portion relative to said capstan and pinch roller.

* * * * *